ns Patent [19]

Barry et al.

[11] 4,333,960
[45] Jun. 8, 1982

[54] PROCESS FOR PRODUCING DEHYDRATED RICE AND PRODUCT FROM PARBOILED RICE

[75] Inventors: James A. Barry, Carlow; James McGarry, Kilkieran, both of Ireland

[73] Assignee: Comhlucht Siuicre Eireann Teoranta (Irish Sugar Company Limited), Dublin, Ireland

[21] Appl. No.: 165,062

[22] Filed: Jul. 1, 1980

[30] Foreign Application Priority Data

Jul. 3, 1979 [IE] Ireland ................................. 474/79
May 16, 1980 [IE] Ireland ................................. 1032/80

[51] Int. Cl.$^3$ ............................................. A23L 1/182
[52] U.S. Cl. ................................... 426/625; 426/450
[58] Field of Search ............... 426/625, 618, 450, 509, 426/510, 511, 523

[56] References Cited

U.S. PATENT DOCUMENTS

| 2,438,939 | 4/1948 | Durrani | 426/627 |
| 2,616,808 | 11/1952 | Roberts | 426/439 |
| 2,715,579 | 8/1955 | Roberts | 426/450 |
| 2,733,147 | 1/1956 | Durrani | 426/627 |
| 2,740,719 | 4/1956 | Durrani | 426/627 |
| 2,937,946 | 5/1960 | Durrani | 426/417 |
| 3,701,667 | 10/1972 | Heike et al. | 426/450 |
| 4,233,327 | 11/1980 | Ando et al. | 426/450 |

FOREIGN PATENT DOCUMENTS

| 657691 | 9/1951 | United Kingdom . |
| 737372 | 9/1955 | United Kingdom . |
| 737446 | 9/1955 | United Kingdom . |
| 737450 | 9/1955 | United Kingdom . |
| 746787 | 3/1956 | United Kingdom . |
| 755750 | 8/1956 | United Kingdom . |
| 955636 | 4/1964 | United Kingdom . |

Primary Examiner—Hiram Bernstein
Attorney, Agent, or Firm—Stevens, Davis, Miller & Mosher

[57] ABSTRACT

The invention concerns a process for the production of "no-cook" dehydrated rice which can be rehydrated and rendered palatable in a few minutes by the addition of boiling water thereto. The process comprises soaking parboiled rice, cooking it, drying it to a moisture content of 2–20% by weight, and puffing the rice at a temperature in the range 150°–350° C. In a preferred embodiment, the parboiled rice is soaked to a moisture content of about 50%, washed, drained, allowed to stand for at least ½ hour, cooked in dry steam, washed, cooled, dried to a moisture content around 10%, allowed to stand for at least ½ hour, and puffed in a stream of hot air for 13–20 seconds at 240°–270° C.

14 Claims, No Drawings

PROCESS FOR PRODUCING DEHYDRATED RICE AND PRODUCT FROM PARBOILED RICE

BACKGROUND OF THE INVENTION

1. Field of the Invention

This invention relates to the processing of rice to produce dehydrated rice, particularly for use in dehydrated foodstuffs such as soups and so-called "instant" foods or "no-cook" foods.

There is increasing commercial interest in dehydrated food preparations which can be rehydrated by the consumer in a few minutes by the addition of boiling water and which do not require any further cooking. Such food preparations can be sold in a container which also acts as a dish. The consumer adds boiling water to the food preparation and obtains a warm, cooked, palatable food which can be eaten after a few minutes. The necessary boiling water can be obtained from a kettle and there is no need for a cooker or a saucepan.

2. Description of the Prior Art

However there has not hitherto been any process available for the reliable production of rice which is suitable for use in "no-cook" food preparations and which is capable of rehydration to a palatable state in 2-3 minutes by the addition of boiling water therein, without additional cooking. Much work has been done in the field of quick-cooking rice (see "Technology of Quick-Cooking Rice" by B. P. Bhat, T. K. Chakrabarty and B. P. Bhatia in "Indian Food Packer", September-October 1972) but processes such as those of A. K. Ozai Durrani in U.S. Pat. Nos. 2,438,939 and 2,733,147 require the product to be further cooked by immersion in boiling water for 2-3 minutes (i.e. heating must be carried out to keep the water boiling) or by bringing the water back to the boil after the rice has been added to it. Disadvantages of the process of U.S. Pat. No. 2,438,939 are set out in Ozai Durrani's later U.S. Pat. No. 2,937,946. U.S. Pat. No. 2,733,147 and Ozai Durrani's British Pat. Nos. 657,691, 737,372 and 737,450 describe processes involving mechanical compression of the rice grain, which is difficult to carry out in large-scale production. British Pat. No. 437,446, also of Ozai Durrani, describes a process involving steaming and drying rice grains. The fact that so many proposals originated from the same inventor illustrates the problem in finding a satisfactory process for the production of a rice product which could be described as quick-cooking.

U.S. Pat. No. 2,715,579 of R. L. Roberts describes the preparation of a rice product which is said to be pre-cooked and whose preparation for the table involves absorption of boiling water without additional cooking. The Roberts' process involves soaking raw white rice in water until its moisture content is about 25 to 35%, heating the soaked rice to completely gelatinize the starch content of the grain without substantial increase in the moisture content thereof, drying the gelatinized grains to a moisture content from about 8 to 14%, and then expanding the dried grains in hot air at 200°-260° C. The present inventors have carried out tests on commercially available raw white rice and have found it to be an unsatisfactory starting material for the production of a "no-cook" rice by expansion or "puffing". When raw white rice of commerce is soaked, the present inventors have observed that a substantial proportion of grains have surface cracks which make the rice difficult to handle in subsequent processing. Also it has been observed that grains of raw white rice do not absorb water in a satisfactory manner in the soaking step.

In an earlier U.S. Pat. No. 2,616,808, R. L. Roberts described the use of parboiled rice in an expansion process to produce a ready-to-eat cereal product i.e. a product not intended to be rehydrated. However, Roberts did not suggest the use of parboiled rice for preparation of pre-cooked rice in the process of U.S. Pat. No. 2,715,579.

SUMMARY OF THE INVENTION

It is an object of the present invention to provide a process for the production of a "no-cook" rice product which does not involve mechanical compression and which can be carried out reliably in large scale production in order to prepare rice capable of rehydration to an acceptable palatable state in 2-3 minutes by the addition of boiling water thereto.

The present invention provides a process for the production of dehydrated rice which comprises soaking paraboiled rice, cooking it, drying the rice to a moisture content in the range 2 to 20% by weight and puffing the rice at a temperature in the range 150°-350° C. The percentages mentioned herein are calculated on the total weight.

Parboiled rice is readily available on a commercial scale. It differs from raw rice in that the rough rice has been treated, e.g. with water and steam, before it is milled to separate the husk from the grain. The parboiling treatment causes partial gelatinization in outer layers of the grain and an absorption of valuable minerals and vitamins into the kernel. In the manufacture of dehydrated foodstuffs in accordance with the present invention, the rice normally used is parboiled long grain rice.

Preferably, in the process of the present invention, parboiled rice of commerce is soaked in water until it has a moisture content in the range 20 to 60% by weight. The aim of the soaking step is to distribute moisture throughout each grain of rice, and more particularly to distribute the moisture evenly. The soaking procedure may involve soaking the rice over a relatively long period e (e.g. for $2\frac{1}{2}$-$3\frac{1}{2}$ hours, particularly about 3 hours), or it may involve a relatively short soaking time, preferably 1-2 hours, followed by a tempering period in which the soaked rice is allowed to stand for a minimum of $\frac{1}{2}$ hour, preferably at least 1 hour, so that the moisture content becomes uniformly spread through the rice.

In the preferred process of the present invention, after the soaking step, the rice is washed to remove starch which has soaked out of the grain. This washing step helps in overcoming sticking during the subsequent processing. After washing, the rice is normally drained.

The soaking is most suitably carried out in water at 15°-30° C., preferably 20°-25° C., particularly about 22° C. However, the temperature of soaking can be varied outside the above limits, with the time being adjusted accordingly. Soaking at a higher temperature will result in diffusion of moisture into the centre of the grain more rapidly. However, it is preferred to carry out soaking at a temperature at which no appreciable gelatinization of starch occurs, i.e. below 65° C.

The preferred product at the end of the soaking step has a moisture content of 40-55% by weight, preferably of the order of 50% by weight.

The cooking step is preferably carried out in dry steam, suitably for about 2-10 minutes, more preferably for 3–5 minutes, particularly about 4 minutes. The steam cooking process is essentially a dry blanching process, so that the grains of rice remain substantially dry on the surface (the moisture being distributed through the grain). If the surface were wet during steam cooking, or if cooking in water for more than a short period were used, excess water would be absorbed into the surface layers of the grain, leading to an undesirable release of starch. It has been found that steam blanching is satisfactory without the application of increased pressure. However, cooking can alternatively be carried out in steam at a pressure up to about 30 pounds per sq. inch gauge (207 kN/m$^2$), or a short period of cooking in water can be followed by pressure cooking.

The cooked rice is preferably washed and cooled so as to stop the cooking process and to wash off any starch which has come out of the grains during cooking. The washing step is suitably carried out in cold or warm water, e.g. at 10°–45° C.

It is usual to dry the cooked rice to a moisture content in the range of 5–20% by weight, more preferably 7–14%, particularly about 10% moisture by weight. This drying step is suitably carried out with air at a temperature of about 50°–65° C., drying being controlled so that the rice is not heated to a temperature above about 55° C.

Drying in a conventional air-dryer such as a Schilde dryer can result in non-uniform drying of the rice. It is preferred therefore to temper the dried rice by allowing it to stand for a minimum of ½ hour, preferably at least one hour to allow residual moisture in the rice to become evenly distributed through the mass of the rice.

The puffing procedure to expand the rice grains is preferably carried out in a current of hot gas particularly air or superheated steam. It is preferred to use dry air at this stage rather than steam in order to avoid condensation which could result in extraction of starch. "Gunpuffing", involving the use of super atmospheric pressure, is not necessary. The puffing temperature is preferably in the range 180°–300° C., more preferably 240°–270° C. The puffing time may suitably be 5–45 seconds, although the time required for puffing is dependent on the temperature used and also on the moisture content of the dried rice grains. It is particularly preferred to carry out the puffing step on rice having a moisture content of about 10% by weight for 13–20 seconds at about 250° C. At lower temperatures (e.g. below 190° C.) puffing must be carried out over longer time periods and care must be taken to ensure that heat is transmitted into the rice grains before the moisture has diffused out. At higher temperatures (above 280° C.) there is a risk of scorching.

The combination of using parboiled rice as the starting material and processing it in accordance with the invention results in a "no-cook" rice which can be reconstituted satisfactorily by addition of boiling water thereto and which can then be eaten as part of a "cooked" foodstuff without any further cooking. It is believed that parboiled rice is advantageous compared to raw white rice because the outer layers of the grain of parboiled rice maintain the structure of the grain and restrict loss of starch during the processing steps so that the grains presented at the puffing stage will expand in a reliable and consistent manner. The preferred embodiment of the invention, involving even distribution of moisture through the grains and two tempering steps to allow moisture to equilibrate after soaking and drying, improves the consistency of the product.

Two embodiments of the invention will now be described by way of Example, the first Example being the preferred embodiment.

DESCRIPTION OF THE PREFERRED EMBODIMENT

EXAMPLE 1

Parboiled long grain rice was soaked for 90 minutes in water at 22° C., resulting in a moisture content of about 50% by weight. The soaked rice was washed in water at ambient temperature (20° C.) to remove surplus starch. The water was then drained off. The rice was tempered by being allowed to lie in a large bin for 1½ hours at ambient temperature (20° C.), during which time any excess water drained off and the remaining moisture content equilibrated i.e. spread uniformly through the rice.

The rice was cooked in dry steam at atmospheric pressure for 4 minutes.

Immediately after cooking, the rice was washed in water at 34° C. to stop further cooking and to remove surplus starch. Surplus water was drained off.

The cooked rice was dried in a Schilde air dryer supplied with air in the range 50°–60° C. for 2¼ hours, resulting in a moisture content of about 10% by weight. The rice was allowed to stand for 1 hour at ambient temperature again to allow the moisture to equilibrate. The dried rice was puffed in a current of air at 250° C. for 20 seconds, a layer of rice generally one grain deep being passed on a stainless steel mesh belt moving through a cabinet in which the first half was supplied from above with a current of air at 250° C. and the second half was supplied with a current of air at ambient temperature. The forwarding speed of the belt was controlled so that the dwell time of the rice in the heated half of the cabinet did not exceed 20 seconds.

In a test of rehydration, 2 gm of the puffed rice was covered with 6 fl. oz (170 cm$^3$) of boiling water, the vessel was covered and allowed to stand for 2 minutes. No additional heating was carried out. The sample was then drained and re-weighed.

The reconstitution ratio was then determined by comparison of the weight of the rehydrated sample with the weight of the dehydrated sample.

Reconstitution ratios in the range 1:2.5 to 1:3.5 were obtained, which indicate satisfactory rehydration in the very short time of 2 minutes. Further tests carried out to test rehydration in a thickened liquid medium comparable to that of soup resulted in satisfactory reconstitution in 3 minutes. In a formulation comparable to that of a prepared meal, satisfactory reconstitution was obtained in 3–5 minutes, particularly about 4 minutes.

Inspection of the puffed rice showed that it was internally porous with a multitude of small pores but no major cavities. The average volume of the puffed rice grain was about 2–4 times the volume of the unpuffed grain.

EXAMPLE 2

1 kg of parboiled long grain rice was soaked for 1 hour in water at ambient temperature, resulting in an added moisture content of about 30% by weight, (total moisture content about 40% by weight). The soaked rice was washed in water at ambient temperature to remove surplus starch.

The rice was pressure cooked for 22 minutes at 15 pounds per square inch gauge (103 kN/m$^2$ above atmospheric pressure) in a layer ½ inch to 2½ inches (1.27–6.35 cm) in depth.

Immediately after cooking, the rice was washed in cold water to stop further cooking and to remove surplus starch.

The cooked rice was dried for 2¾ hours at 52° C., resulting in a moisture content of about 10% by weight. The dried sample was puffed by placing it in a current of air at 250° C. for 20 seconds.

In a test of rehydration, 2 gm of the puffed rice was covered with 6 fl. oz (170 cm³) of boiling water, the vessel was covered and allowed to stand for 2 minutes. The sample was then drained and re-weighed.

The reconstitution ratio was then determined by comparison of the weight of the rehydrated sample with the weight of the dehydrated sample.

Reconstitution ratios in the range 1:2.3 to 1:2.5 were obtained, which indicate satisfactory rehydration in the very short time of 2 minutes.

Further tests carried out to test rehydration in a thickened liquid medium comparable to that of soup resulted in satisfactory reconstitution in 3 minutes.

Inspection of the puffed rice showed that it was internally porous. The average volume of the puffed rice grain was about twice the volume of the unpuffed grain.

We claim:

1. A process for the production of dehydrated rice without mechanical compression of the rice grains, said dehydrated rice being capable of rehydration to a palatable state in 2–3 minutes by the addition of boiling water thereto, without additional cooking, which process comprises soaking parboiled rice, washing it, cooking the soaked rice, drying the cooked rice to a moisture content in the range 2–20% by weight, and puffing the dried rice at a temperature in the range 180°–350° C.

2. A process according to claim 1, wherein the puffing procedure is carried out in hot air at a temperature in the range 240°–270° C. for 5–45 seconds.

3. A process according to claim 2, wherein the puffing procedure is carried out on dried rice having a moisture content of about 10% for 13–20 seconds at a temperature in the range 240°–270° C.

4. A process according to claim 1, wherein the parboiled rice at the end of the soaking step has a moisture content in the range 40–55% by weight.

5. A process according to claim 4, wherein the parboiled rice is soaked for 1–2 hours at a temperature of 20°–25° C.

6. A process according to claim 5, wherein the soaked rice is washed, drained and allowed to stand for a minimum of ½ hour before cooking.

7. A process according to claim 1, wherein the cooked rice is dried to a moisture content of 7–14% by weight.

8. A process according to claim 1, wherein the dried rice is allowed to stand for a minimum of ½ hour before puffing.

9. A process according to claim 1, wherein the puffing procedure is carried out by a current of hot air directed downwardly on to the dried rice moving on a belt.

10. A process according to claim 9, wherein the air has a temperature of about 250° C. and the speed of movement of the belt is such that the dwell time of the dried rice in the hot air does not exceed 25 seconds.

11. A process according to claim 4 wherein the parboiled rice is soaked in water at a temperature at which no appreciable gelatinization of starch occurs.

12. A process according to claim 1 wherein the dried rice is puffed by a current of hot air and cooled by a current of air at ambient temperature.

13. A process according to claim 1 wherein the cooked rice is washed and cooled to stop the cooking process and to wash off surplus starch.

14. Dehydrated rice produced by a process according to claim 1.

* * * * *